United States Patent
Lee

(10) Patent No.: US 12,491,906 B2
(45) Date of Patent: Dec. 9, 2025

(54) APPARATUS, METHOD, STORAGE MEDIUM AND PROGRAM FOR CONTROLLING VEHICLE

(71) Applicant: HL MANDO CORPORATION, Gyeonggi-do (KR)

(72) Inventor: Taeyoung Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 309 days.

(21) Appl. No.: 18/142,571

(22) Filed: May 2, 2023

(65) Prior Publication Data
US 2024/0034351 A1 Feb. 1, 2024

(30) Foreign Application Priority Data
Jul. 28, 2022 (KR) .................. 10-2022-0093667

(51) Int. Cl.
*B60W 60/00* (2020.01)
*B62D 6/00* (2006.01)
*B62D 15/02* (2006.01)

(52) U.S. Cl.
CPC ............ *B60W 60/001* (2020.02); *B62D 6/001* (2013.01); *B62D 15/02* (2013.01); *B60W 2710/20* (2013.01)

(58) Field of Classification Search
CPC ........... B60W 60/001; B60W 2710/20; B60W 50/14; B60W 10/20; B60W 50/0205; B60W 2050/021; B60W 2050/143; B60W 2510/205; B60W 2520/10; B60W 2540/18; B60W 60/00; B62D 6/001; B62D 15/02; B62D 15/025; B62D 5/0481; B62D 5/0487; B62D 15/029; B60Y 2400/90
USPC .......................................................... 701/41
See application file for complete search history.

(56) References Cited

U.S. PATENT DOCUMENTS

2020/0317261 A1* 10/2020 Shoji ..................... B60W 50/14
2021/0394824 A1* 12/2021 Kakimoto .............. B62D 5/001

* cited by examiner

*Primary Examiner* — Shardul D Patel
(74) *Attorney, Agent, or Firm* — WOMBLE BOND DICKINSON (US) LLP

(57) ABSTRACT

An apparatus for controlling a vehicle may include a steering motor configured to generate a steering force based on steering-related information of a vehicle received from an autonomous driving module of the vehicle in an autonomous driving mode, a controller configured to learn a current value of the steering motor under one or more set learning conditions, and a storage configured to store the current value of the steering motor learned by the controller under the set learning conditions as learned data. The controller may generate a warning signal when a change in the current value of the steering motor measured upon steering is out of a predetermined range compared to, or set based on, the learned data stored in the storage.

20 Claims, 3 Drawing Sheets

APPARATUS, METHOD, STORAGE MEDIUM AND PROGRAM FOR CONTROLLING VEHICLE

CROSS-REFERENCE TO RELATED APPLICATION

This application claims priority to and the benefit of Korean Patent Application No. 10-2022-0093667, filed on Jul. 28, 2022, the disclosure of which is incorporated herein by reference in its entirety.

BACKGROUND

1. Technical Field

The present disclosure generally relates to an apparatus, method, storage medium and program for controlling a vehicle, and more specifically, to an apparatus, method, storage medium and program for controlling a vehicle by monitoring a current value of a steering motor and detecting abnormality upon autonomous driving.

2. Discussion of Related Art

When a mechanical abnormality occurs such as increased friction of a steering mechanism when a vehicle autonomously drives, a situation in which a steering motor does not follow a target steering angle set by an autonomous drive mechanism may occur. In this case, the autonomous driving of the vehicle may not be performed safely, thereby causing accidents. Therefore, it is necessary to develop a technology for continuously detecting whether the steering motor can follow the target steering angle set by the autonomous driving module and detecting abnormality in advance to provide a warning signal to a driver upon autonomous traveling, thereby preventing accidents.

SUMMARY

Some exemplary embodiments of the present disclosure may be directed to providing an apparatus, method, storage medium, and program for controlling a vehicle by detecting whether a steering motor of the vehicle is abnormal in an autonomous traveling mode and providing warning to a driver.

In addition, certain exemplary embodiments of the present disclosure may be directed to providing an apparatus, method, storage medium, and program for controlling a vehicle, which may efficiently learn a current value of a steering motor of the vehicle and effectively detect abnormality of the steering motor using the learned current value of the steering motor in the autonomous traveling mode.

The objects of the present disclosure are not limited to the above-described objects, and other objects that are not mentioned will be able to be clearly understood by those skilled in the art to which the present disclosure pertains from the following description.

According to one aspect of the present disclosure, there is provided an apparatus for controlling a vehicle including a steering motor configured to generate a steering force based on steering-related information of a vehicle received from an autonomous traveling module of the vehicle in an autonomous traveling mode, a controller configured to learn a current value of the steering motor in a set learning condition, and a storage configured to store the current value of the steering motor learned by the controller as learning data, wherein the controller in the learning condition generates a warning signal when it is shown that a change in the current value of the steering motor measured upon steering is out of a predetermined range compared to the learning data stored in the storage.

In the apparatus for controlling the vehicle according to one embodiment of the present disclosure, the learning condition may include a speed, a steering angle, and a steering speed of the vehicle.

In the apparatus for controlling the vehicle according to one embodiment of the present disclosure, one or more speeds of the vehicle may be previously specified.

In the apparatus for controlling the vehicle according to one embodiment of the present disclosure, one or more combinations of the steering angle and the steering speed are each previously specified.

In the apparatus for controlling the vehicle according to one embodiment of the present disclosure, when the speed, the steering angle, and the steering speed of the vehicle upon steering correspond to the learning condition, the controller may directly compare the current value of the steering motor measured upon steering with the learning data.

In the apparatus for controlling the vehicle according to one embodiment of the present disclosure, when the speed, the steering angle, and the steering speed of the vehicle upon steering do not correspond to the learning condition, the controller may estimate the current value of the steering motor upon steering from the learning data and compare the current value of the steering motor measured upon steering with the estimated current value of the steering motor.

In the apparatus for controlling the vehicle according to one embodiment of the present disclosure, the current value of the steering motor may be measured accumulatively from a start of the steering to an end of the steering under the learning condition.

In the apparatus for controlling the vehicle according to one embodiment of the present disclosure, the controller may learn the current value of the steering motor according to the learning condition only when a learning execution condition is satisfied.

According to another aspect of the present disclosure, there is provided a method of controlling a vehicle including learning, by a controller, a current value of a steering motor for generating a steering force based on steering-related information of a vehicle received from an autonomous traveling module of the vehicle in an autonomous traveling mode under a set learning condition, storing, by a storage, the current value of the steering motor under the learning condition learned by the controller as learning data, comparing, by the controller, the current value of the steering motor measured upon steering with the learning data, and generating, by the controller, a warning signal when it is shown that a change in the current value of the steering motor measured upon steering is out of a predetermined range compared to the learning data stored in the storage.

In the method for controlling the vehicle according to one embodiment of the present disclosure, the learning condition may include one or more previously specified speeds and one or more previously specified combinations of the steering angle and the steering speed of the vehicle.

In the method for controlling the vehicle according to one embodiment of the present disclosure, when the speed, the steering angle, and the steering speed of the vehicle upon steering correspond to the learning condition, the controller may directly compare the current value of the steering motor measured upon steering with the learning data.

In the method for controlling the vehicle according to one embodiment of the present disclosure, when the speed, the steering angle, and the steering speed of the vehicle upon steering do not correspond to the learning condition, the controller may estimate the current value of the steering motor upon steering from the learning data and compare the current value of the steering motor measured upon steering with the estimated current value of the steering motor.

The method for controlling the vehicle according to one embodiment of the present disclosure may further include determining, by the controller, whether a learning execution condition is satisfied before the learning operation, wherein the learning operation may be performed when the learning execution condition is satisfied.

In the method for controlling the vehicle according to one embodiment of the present disclosure, the learning operation may include determining, by the controller, whether the learning condition is satisfied upon steering and learning, by the controller, the current value of the steering motor when the learning condition is satisfied.

According to still another aspect of the present disclosure, there is provided a program for controlling a vehicle stored in a recording medium in order to perform operations of learning, by a controller, a current value of a steering motor for generating a steering force based on steering-related information of a vehicle received from an autonomous traveling module of the vehicle in an autonomous traveling mode under a set learning condition, storing, by a storage, the current value of the steering motor under the learning condition learned by the controller as learning data, comparing, by the controller, the current value of the steering motor measured upon steering with the learning data, and generating, the controller, a warning signal when it is shown that a change in the current value of the steering motor measured upon steering is out of a predetermined range compared to the learning data stored in the storage.

In the program for controlling the vehicle according to one embodiment of the present disclosure, the learning condition may include one or more previously specified speeds and one or more previously specified combinations of the steering angle and the steering speed of the vehicle.

In the program for controlling the vehicle according to one embodiment of the present disclosure, when the speed, the steering angle, and the steering speed of the vehicle upon steering correspond to the learning condition, the controller may directly compare the current value of the steering motor measured upon steering with the learning data.

In the program for controlling the vehicle according to one embodiment of the present disclosure, when the speed, the steering angle, and the steering speed of the vehicle upon steering do not correspond to the learning condition, the controller may estimate the current value of the steering motor upon steering from the learning data and compare the current value of the steering motor measured upon steering with the estimated current value of the steering motor.

The program for controlling the vehicle according to one embodiment of the present disclosure may further perform determining, by the controller, whether a learning execution condition is satisfied before the learning operation, wherein the learning operation may be performed when the learning execution condition is satisfied.

In the program for controlling the vehicle according to one embodiment of the present disclosure, the learning operation may include determining, by the controller, whether the learning condition is satisfied upon steering and learning, by the controller, the current value of the steering motor when the learning condition is satisfied.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
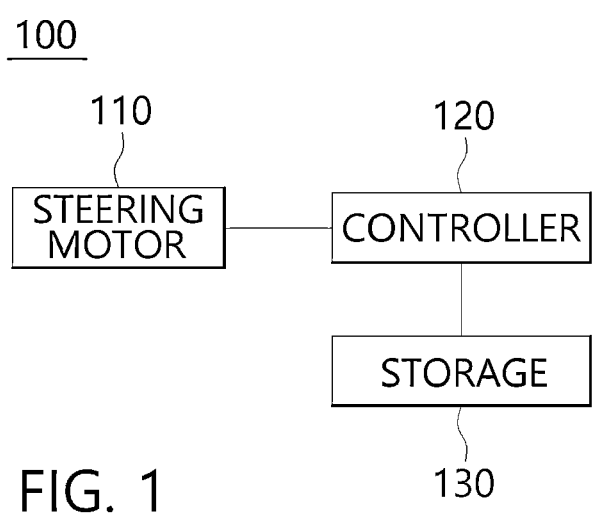
FIG. 1 is a configuration diagram of an apparatus for controlling a vehicle according to an embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used In the specification and the claims are not limitedly construed as their ordinary or dictionary meanings, and should be construed as meaning and concept consistent with the technical spirit of the present disclosure in accordance with the principle that the inventors can define terms and concepts in order to best describe their invention.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

FIG. 1 is a configuration diagram of an apparatus for controlling a vehicle according to an embodiment of the present disclosure.

Referring to FIG. 1, an apparatus 100 for controlling a vehicle according to one embodiment of the present disclosure includes a steering motor 110, a controller 120, and a storage 130. The apparatus 100 for controlling the vehicle according to one embodiment of the present disclosure can efficiently learn a current value of the steering motor 110 of the vehicle in an autonomous driving or traveling mode of the vehicle and effectively detect abnormality of the steering motor 110 using the learned current value of the steering motor 110.

In one embodiment of the present disclosure, the autonomous driving or traveling mode may perform an angle overlay function. For example, the angle overlay function may compare a steering angle of the vehicle measured by a steering angle sensor and a target steering angle set by an autonomous driving or traveling module configured to autonomously drive the vehicle when the vehicle autonomously drives or travels, and control the steering motor 110 of the vehicle so that the steering angle of the vehicle follows or is controlled to be the target steering angle set by the autonomous driving module. Of course, this is illustrative, and the present disclosure may be applied even when the steering motor 110 is driven by another control method in the autonomous driving or traveling mode.

The autonomous driving or traveling module may include, for example, but not be limited to, a processor, computer, digital signal processor (DSP), memory, storage, register, timing, interrupt, communication interface, and input/output signal interfaces, and the like, as well as combinations comprising at least one of the foregoing. For example, the autonomous driving or traveling module may comprise a processor, a storage medium and/or programmable memory, which are capable of storing and executing one or more algorithms, commands, signals, instructions or methods to effect control of the vehicle for performing autonomous driving and, possibly, other components of the vehicle. The autonomous driving or traveling module may be in communication with the apparatus 100, numerous sensors, communication systems, and other electronic control units (ECU) of the vehicle, or may be included in the apparatus 100.

The steering motor 110 may be configured to generate a steering force for steering or controlling the vehicle based on steering-related information of the vehicle received from the autonomous driving or traveling module of the vehicle in the autonomous driving or traveling mode. For example, the steering motor 110 may be configured and disposed to provide a driving force to a steering shaft connected to a steering wheel of the vehicle. In this example, the steering motor 110 may be a motor of an electric power steering (EPS). As another example, the steering motor 110 may be applied to a steer-by-wire steering system and may be configured or disposed to provide a driving force for changing a direction of at least one wheel of the vehicle. In this example, the steering motor 110 may be a motor for driving a linearly movable part or member (e.g., a rack bar) connected to at least one wheel of the vehicle to change the direction of the wheel of the vehicle.

The controller 120 is configured to learn a current value of the steering motor 110 under a set learning condition. The current value of the steering motor 110 can be measured by a sensor, a circuit or the controller 120. In an embodiment of the present disclosure, the learning may include an operation of measuring the current value of the steering motor 110 when the set learning condition is satisfied. The controller 120 may be formed as an electronic control unit (ECU) or processor for learning the current value of the steering motor 110. The current value of the steering motor 110 may be measured and accumulated from the start of the steering to the end of the steering under the learning condition.

The learning condition may include, for example, but not limited to, one or more of a speed of the vehicle, steering angle, steering speed of the vehicle, and any condition associated with the operation of the vehicle. More specifically, one or more speeds of the vehicle may be previously specified and preset. In addition, one or more combinations of a steering angle and a steering speed may each be previously specified and preset. For example, assuming that the vehicle autonomously drives or travels, the learning condition that the speed of the vehicle is 80 km/h, the steering angle of the steering wheel is 10 degrees (which can be changed from 0 degrees to 10 degrees), and the steering speed is 100 deg/sec is preset. When this preset learning condition is satisfied, the controller 120 continuously learn the current value of the steering motor 110.

A plurality of the learning conditions may be specified and set. For example, the leaning condition of the speed of the vehicle may be set to be a plurality of speeds of the vehicle, 10 km/h, 50 km/h, and 100 km/h, and one or more combinations of the steering angles and the steering speeds are set to corresponding to each respective speed of the vehicle. When a steering situation (e.g. steering-related levels of the vehicle sensed by sensors) corresponds to, or satisfies, the preset learning condition while the vehicle autonomously drives or travels, the controller 120 may learn a current value of the steering motor 110 in the corresponding steering situation. The learning condition may be variously set in consideration of the state of the vehicle, external environments, and the like, and the set learning condition may be changed or adjusted as much as possible according to situations.

In one embodiment of the present disclosure, the controller 120 may learn the current value of the steering motor 110 according to the learning condition only when a learning execution condition is satisfied. The learning execution condition may mean a condition in which a current value of the vehicle suitable for use as reference data for later determining whether the steering motor 110 is normally operated may be measured.

For example, the learning execution condition may be a case in which an air temperature outside the vehicle is measured to be 0° C. or higher. The current value of the steering motor 110 may increase in a steering situation in which the outside air temperature is as low as sub-zero because a mechanical friction increases in a steering system as compared to a case in which the air temperature of the vehicle is a room temperature, and since the current value measured in this situation is obtained in a unusual or special situation and not suitable to be used as a reference for later determining whether the steering motor 110 is normally operated, it may be low to be used for learned data.

The storage 130 stores the current values of the steering motor 110 under the learning condition learned by the controller 120 as learned data. The storage 130 may be communicationally or electrically connected to the controller 120 and may store the learned data. In this case, when there are two or more current values of the steering motor 110 measured under the same learning condition, the controller 120 may calculate an average value of the current values of the steering motor 110 measured under the same learning condition, and the storage 130 may also store the calculated average value as a current value of the steering motor 110 measured under that learning condition.

The storage 130 may cumulatively store the learned data. In addition, some of the learned data may also be deleted from the storage 130 based on the stored order, the stored period, and the like in consideration of a storage capacity of the storage 130.

The storage 130 may be any storage medium capable of storing the learned data of the current values of the steering motor 110 under the learning condition(s) learned by the controller 120. For example, the storage 130 may be implemented as an internal memory such as a read-only memory (ROM) or a random access memory (RAM) included in the controller 120 or may also be implemented independently of or separately from the controller 120. In addition, the storage 130 may be implemented in a form embedded in the controller 120 or may also be implemented in a form detachable from the controller 120.

In one embodiment of the present disclosure, the controller 120 may generate a warning signal when a change in the current value of the steering motor 110 measured upon steering is out of a predetermined range compared to, or determined or set based on, the learned data stored in the storage 130. When a failure, fault or defect in the steering system occurs, there may be a case in which a mechanical friction force may be increased, and conversely, there may be a case in which a friction force may be decreased due to abrasion and the like. In the former case, the current value of the steering motor 110 is increased, and in the latter case, the current value of the steering motor 110 is decreased.

In this case, the predetermined range may include a case in which the current value of the steering motor 110 measured upon steering is increased or decreased by 20% or more compared to the learned data. Of course, this is for illustrative purposes only, and the predetermined range may be adjusted in consideration of the vehicle, the external environments, and the like. In addition, the warning signal may include, for example, but not limited to, one or more of a visual signal and an auditory signal.

Hereinafter, embodiments of a comparison between the current value of the steering motor 110 measured by the controller 120, a sensor or a circuit upon steering and the learned data stored in the storage 130 will be described in detail.

First, when the speed of the vehicle, the steering angle, and the steering speed of the vehicle measured upon steering correspond to the learning condition, the controller 120 may compare the current value of the steering motor 110 measured upon steering with the learned data stored in the storage 130. In other words, when the steering situation of the vehicle at an arbitrary time point of the vehicle that autonomously drives or travels corresponds to a preset learning condition, the current value of the steering motor 110 in the corresponding steering situation may be stored as a learning target in the storage 130 and at the same time, compared with present training data learned under the same learning condition. At this time, when two or more current values of the steering motor 110 learned under one learning condition corresponding to the steering situation are present, the controller 120 may compare an average value of the learned current values of the steering motor 110 with the current value of the steering motor 110 measured upon steering.

Next, when the speed of the vehicle, the steering angle, and the steering speed of the vehicle measured upon steering do not correspond to, or are out of, the learning condition, the controller 120 may estimate the current value of the steering motor 110 from the learned data and compare the current value of the steering motor 110 measured upon steering with the estimated current value of the steering motor 110. For example, the estimation may be made through interpolation or the like, and correction factors such as a change in steering friction force according to the speed of the vehicle may be considered.

As described above, assuming that the vehicle autonomously drives or travels, the speeds of the vehicle are set to 10 km/h, 50 km/h, and 100 km/h as the learning condition and one or more combinations of the steering angles and the steering speeds at each respective speed are set, the controller 120 may compare an estimated value estimated from the learned data with the current value of the steering motor 110 measured upon steering when the steering is performed at an arbitrary steering angle and steering speed at the speed of the vehicle of 60 km/h. Through this method, the controller 120 may determine whether the steering motor 110 is abnormal even in a steering situation of the vehicle that does not correspond to the learning condition stored in the storage 130.

As described above, the controller 120 can detect whether the steering motor 110 is abnormal in real time upon autonomous driving or traveling by determining whether the steering motor 110 is abnormal through the estimation described above even when the steering situation of the vehicle does not correspond to the learning condition, thereby further improving the safety of the vehicle.

Meanwhile, the controller 120 may also determine whether the current value of the steering motor 110 is abnormal at the same time as learning the current value of the steering motor 110 only when the steering situation corresponds to the learning condition. In this case, since the controller 120 does not perform estimation or the like, it is possible to minimize the use of resources such as power or calculation by the controller 120. When the controller 120 operates as described above, a plurality of learning conditions are set to various speeds, steering angles, and steering speeds of the vehicle in order to effectively detect whether the steering motor 110 is abnormal.

Figure 2:
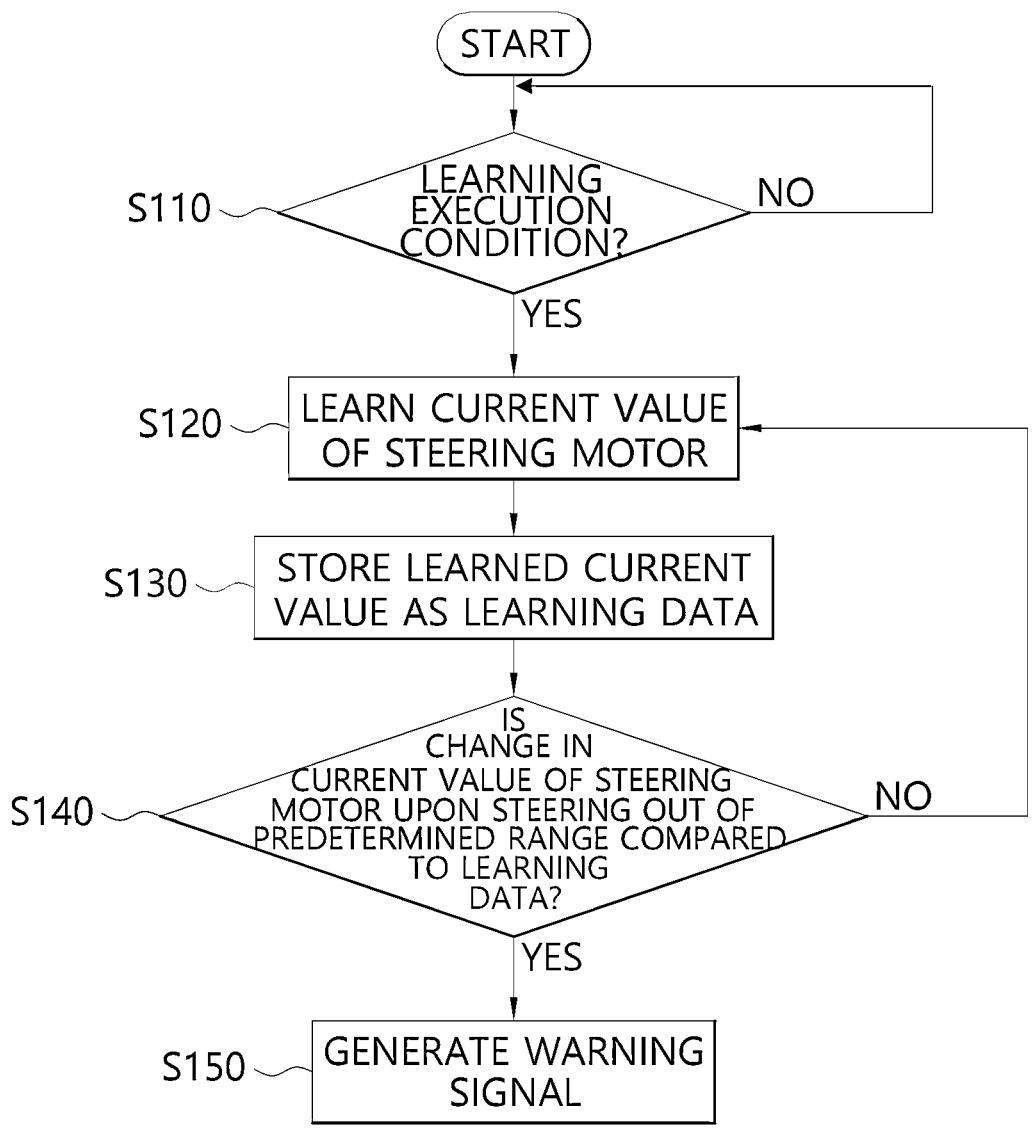
FIG. 2 is a flowchart of a method for controlling a vehicle according to an embodiment of the present disclosure.

FIG. 2 is a flowchart of a method for controlling a vehicle according to one embodiment of the present disclosure. The method of controlling the vehicle according to one embodiment of the present disclosure may be performed by the apparatus 100 for controlling the vehicle according to one embodiment of the present disclosure. Referring to FIG. 2, the method of controlling the vehicle according to one embodiment of the present disclosure will be described in detail.

First, the controller 120 determines whether a learning execution condition is satisfied (S110). The learning execution condition may mean a condition in which a current value of the vehicle suitable for use as a reference for later determining whether the steering motor 110 is normally operated may be measured. For example, the learning execution condition may include a condition in which a measured air temperature outside the vehicle is 0° C. or higher.

Next, when the learning execution condition is satisfied at S110, the controller 120 learns a current value of the steering motor 110 according to the learning condition (S120). For example, the current value of the steering motor 110 may be measured by a sensor or circuit. The learning may include an operation of measuring the current value of the steering motor 110 by the controller 120 when the set learning condition is satisfied. The controller 120 learns the current value of the steering motor 110 for generating the steering force based on the steering-related information of the vehicle received from the autonomous driving or traveling module of the vehicle in the autonomous driving or traveling mode under the set learning conditions.

Figure 3:
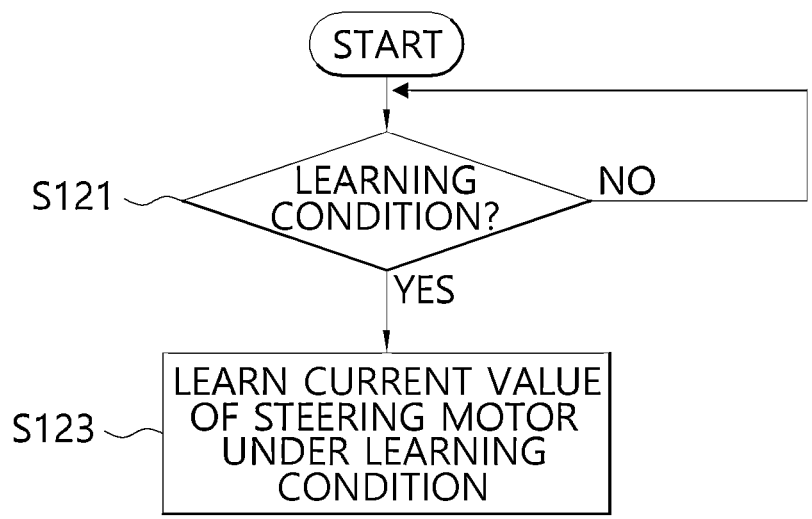
FIG. 3 is a detailed flowchart of a learning operation in a method of controlling a vehicle according to an embodiment of the present disclosure.

FIG. 3 is a detailed flowchart of a learning operation in a method of controlling a vehicle according to one embodiment of the present disclosure. Referring to FIG. 3, the controller 120 determines whether a learning condition is satisfied upon steering of the vehicle (S121). The learning condition may include one or more previously specified or preset speeds of the vehicle and one or more previously specified or preset combinations of a steering angle and a steering speed of the vehicle. The learning condition may be variously set in consideration of the state of the vehicle, external environments, and the like, and the set learning condition may be adjusted or changed as much as possible according to situations. Subsequently, when the steering situation of the vehicle corresponds to the learning condition, the controller 120 learns the current value of the steering motor 110 (S123). The current value of the steering motor 110 can be measured by a sensor, a circuit or the controller 120. In this case, the current value of the steering motor 110 may be accumulatively measured from the start of the steering to the end of the steering under the learning condition. In addition, when the learning condition is satisfied, the controller 120 may continuously learn the current value of the steering motor 110.

Next, returning to FIG. 2, the storage 130 stores the current value of the steering motor 110 under the learning condition learned by the controller 120 as learned data (S130). At this time, when there are two or more current values of the steering motor 110 measured under the same learning condition, the controller 120 may calculate an average value of the current values of the steering motor 110 measured under the same learning condition, and the storage 130 may also store the calculated average value as a current value of the steering motor 110 measured under that learning condition.

The storage 130 may cumulatively store the learned data. In addition, some of the learned data may also be deleted from the storage 130 based on the stored order, the stored period, and the like in consideration of a storage capacity of the storage 130.

Next, the controller 120 compares the current value of the steering motor 110 measured upon steering with the learned data stored in the storage 130 (S140).

First, when the speed of the vehicle, the steering angle, and the steering speed of the vehicle measured upon steering correspond to, or satisfy, the learning condition, the controller 120 may compare the current value of the steering motor measured upon steering with the learned data stored in the storage 120. In other words, when the steering situation of the vehicle at an arbitrary time point of the vehicle that autonomously drives or travels corresponds to a preset learning condition, the current value of the steering motor 110 in the corresponding steering situation may be stored as a learning target and at the same time, be compared with present learned data learned from the same learning condition. For example, when there are two or more current values of the steering motor 110 learned under the same learning condition corresponding to the corresponding steering situation, the controller 120 may compare the average value of the learned current values of the steering motor 110 with the current values of the steering motor 110 measured upon steering.

Next, when the speed of the vehicle, the steering angle, and the steering speed of the vehicle upon steering do not correspond to the learning condition, the controller 120 may estimate the current value of the steering motor 110 from the learned data and compare the current value of the steering motor 110 measured upon steering with the estimated current value of the steering motor 110. For example, the estimation may be made through interpolation or the like, and one or more correction factors such as a change in steering friction force according to the speed of the vehicle may be considered.

Through this method, the controller 120 may determine whether the steering motor 110 is abnormal even in a steering situation that does not correspond to, or satisfy, the learning condition. As described above, the controller 120 may accurately detect whether the steering motor 110 is abnormal in real time upon autonomous traveling by determining whether the steering motor 110 is abnormal through the estimation even when the steering situation of the vehicle does not correspond to the learning condition, thereby improving the safety of the vehicle.

Meanwhile, the controller 120 may also determine whether the current value of the steering motor 110 is abnormal at the same time as learning the current value of the steering motor only when the steering situation corresponds to the learning condition. In this case, since the controller 120 does not perform the estimation or the like, the determination of the controller 120 can be made efficiently. When the controller 120 operates as described above, a plurality of learning conditions are set to various speeds of the vehicle, steering angles, and steering speeds of the vehicle in order to effectively detect whether the steering motor 110 is abnormal.

Finally, when a change in the current value of the steering motor measured upon steering is out of the predetermined range compared to, or determined or set based on, the learned data stored in the storage, the controller 120 generates a warning signal (S150). When a failure, fault or defect in the steering system occurs, there may be a case in which a mechanical friction force may be increased, and conversely, there may be a case in which a friction force may be decreased due to abrasion and the like. In the former case, the current value of the steering motor 110 is increased, and in the latter case, the current value of the steering motor 110 is decreased. Therefore, when the current value of the steering motor is changed by a certain level or more, it may be highly likely that a failure, fault or defect in the steering system has occurred. In this case, the predetermined range may include a case in which the current value of the steering motor 110 measured upon steering is increased or decreased by 20% or more compared to the learned data. Of course, this is for illustrative purposes only, and the predetermined range may be adjusted in consideration of the vehicle, the external environments, and the like. In addition, the warning signal may include, for example, but not limited to, one or more of a visual signal and an auditory signal.

The method of controlling the vehicle according to one embodiment of the present disclosure may be implemented in the form of program instructions that may be executed through various computer means and recorded on computer-readable recording media. The recording media include magnetic media such as a hard disc, a floppy disk, and a magnetic tape, optical recording media such as a compact disc read only memory (CD-ROM) and a digital video disc (DVD), magneto-optical media such as a floptical disk, and a hardware device configured to store and execute program instructions such as a ROM, a RAM, and a flash memory. Meanwhile, the program may include high-level language codes executable by a computer as well as machine code generated by a compiler.

Specifically, a program or instructions for controlling the vehicle according to one embodiment of the present disclosure may be stored in the recording media to perform the operation S120 of learning, by the controller 120, the current value of the steering motor 110 for generating the steering force under the set learning condition based on the steering-related information of the vehicle received from the autonomous driving or traveling module of the vehicle in the autonomous traveling mode, the operation S130 of storing, by the storage 130, the current value of the steering motor 110 under the learning condition learned by the controller 120 as learned data, the operation S140 of comparing, by the controller 120, a current value of the steering motor 110 measured upon steering with the learned data stored in the storage 130, and the operation S150 of generating, by the controller 120, the warning signal when a change in the current value of the steering motor 110 measured upon steering is out of a predetermined range compared to, or determined or set based on, the learned data stored in the storage 130. When the controller 120 generates the warning signal, the controller 120 may generate the warning signal when an increase or decrease in the current value of the steering motor measured upon steering is out of the predetermined range compared to, or determined or set based on, the learned data stored in the storage 130.

The learning condition may include one or more previously specified or preset speeds of the vehicle and one or more previously specified or preset combinations of a steering angle and a steering speed of the vehicle. In addition, when the speed of the vehicle, the steering angle, and the steering speed of the vehicle measured upon steering correspond to the learning condition, the controller 120 may compare the current value of the steering motor 110 measured upon steering and the learned data stored in the storage 130. In addition, when the speed of the vehicle, the steering angle, and the steering speed of the vehicle measured upon steering do not correspond to the learning condition, the controller 120 may estimate the current value of the steering motor 110 from the learned data stored in storage 130 and compare the current value of the steering motor 110 measured upon steering with the estimated current value of the steering motor 110.

Meanwhile, the program for controlling the vehicle according to one embodiment of the present disclosure may further perform the operation S110 of determining, by the controller 120, whether the learning execution condition is satisfied before the learning operation S120. In this case, the learning operation S120 may be performed when the learning execution condition is satisfied.

In addition, as described above, the learning operation S120 performed by the program for controlling the vehicle according to one embodiment of the present disclosure may include the operation S121 of determining, by the controller 120, whether the learning condition is satisfied upon steering and the operation S123 of learning, by the controller 120, the current value of the steering motor 110 when the learning condition is satisfied.

According to some exemplary embodiments of the present disclosure, when abnormality, such as an increase in friction of a steering mechanism, occurs upon autonomous traveling of the vehicle, the abnormality is effectively detected and an appropriate warning signal may be provided to the driver. Therefore, when the vehicle autonomously travels, the safety of the vehicle can be increased, thereby preventing accidents.

In a first aspect of one embodiment of the present disclosure, a controller of an apparatus for controlling an vehicle may learn the current value of the steering motor according to a learning condition only when a learning execution condition is satisfied and/or the learning execution condition may be a case in which an outside air temperature is measured to 0° C. or higher.

In a second aspect of one embodiment of the present disclosure, a warning signal generated by a controller of an apparatus for controlling a vehicle may include at least one of a visual signal and/or an audible signal for informing abnormality of a steering system of the vehicle.

In a third aspect of one embodiment of the present disclosure, a steering motor of an apparatus for controlling a vehicle may provide a driving force to a steering shaft connected to a steering wheel.

In a fourth aspect of one embodiment of the present disclosure, a steering motor of an apparatus for controlling a vehicle may be applied to a steer-by-wire steering system and may provide a driving force for changing the direction of at least one wheel of the vehicle.

In a fifth aspect of one embodiment of the present disclosure, a controller of an apparatus for controlling a vehicle may generate a warning signal when an increase in a current value of a steering motor measured upon steering is out of a predetermined range compared to, or determined or set based on, learned data stored in a storage of the apparatus for controlling the vehicle.

In a sixth aspect of one embodiment of the present disclosure, a controller of an apparatus for controlling a vehicle may generate a warning signal when a decrease in a current value of a steering motor measured upon steering is out of a predetermined range compared to, or determined or set based on, learned data stored in a storage of the apparatus for controlling the vehicle.

With the above configurations according to certain exemplary embodiments of the present disclosure, it is possible to effectively detect abnormality of a steering motor and provide an appropriate warning to a driver by continuously monitoring a current value of the steering motor in an autonomous traveling mode.

In addition, according to some exemplary embodiments of the present disclosure, since a current value of a steering motor of a vehicle is learned in the autonomous traveling mode only when a learning execution condition and a learning condition are satisfied, it is possible to efficiently learn the current value of the steering motor.

It should be understood that the effects of the present disclosure are not limited to the above-described effects and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. An apparatus for controlling a vehicle, the apparatus comprising:
    a steering motor configured to generate a steering force based on steering-related information of the vehicle received from a processor of an autonomous driving module;
    a controller configured to learn a measured current value of the steering motor under one or more set learning conditions; and
    a storage configured to store the measured current value of the steering motor, learned under the learning conditions by the controller, as learned data,
    wherein the controller is configured to generate a warning signal when a change in the measured current value of the steering motor is out of a predetermined range set based on the learned data stored in the storage.

2. The apparatus of claim 1, wherein the one or more set learning conditions include one or more speeds of the vehicle, one or more steering angles, and one or more steering speeds.

3. The apparatus of claim 2, wherein the one or more speeds of the vehicle included in the set learning conditions are preset.

4. The apparatus of claim 3, wherein one or more combinations of the one or more steering angles and the one or more steering speeds included in the set learning conditions are preset.

5. The apparatus of claim 3, wherein the controller is configured to, when a measured speed of the vehicle, a measured steering angle, and a measured steering speed satisfy the one or more set learning conditions, compare the measured current value of the steering motor with the learned data stored in the storage.

6. The apparatus of claim 3, wherein the controller is configured to, when a measured speed of the vehicle, a measured steering angle, and a measured steering speed do not satisfy the one or more set learning conditions, estimate a current value of the steering motor from the learned data stored in the storage, and compare the measured current value of the steering motor with the estimated current value of the steering motor.

7. The apparatus of claim 1, wherein the storage is configured to accumulatively store the current value of the steering motor measured from a start of the steering to an end of the steering under the one or more set learning conditions.

8. The apparatus of claim 1, wherein the controller is configured to learn the measured current value of the steering motor under the one or more set learning conditions only when one or more learning execution conditions are satisfied.

9. A method of controlling a vehicle, the method comprising:
  learning, by a controller, a measured current value of a steering motor under one or more set learning conditions, the steering motor configured to generate a steering force based on steering-related information of the vehicle received from a processor of an autonomous driving module;
  storing, by a storage, the measured current value of the steering motor, learned by the controller under the one or more set learning conditions, as learned data;
  comparing, by the controller, the measured current value of the steering motor with the learned data stored in the storage; and
  generating, by the controller, a warning signal when a change in the measured current value of the steering motor is out of a predetermined range set based on the learned data stored in the storage.

10. The method of claim 9, wherein the one or more set learning conditions include one or more preset speeds of the vehicle and one or more preset combinations of one or more preset steering angles and one or more preset steering speeds.

11. The method of claim 10, further comprising, when a measured speed of the vehicle, a measured steering angle, and a measured steering speed satisfy the one or more set learning conditions, comparing, by the controller, the measured current value of the steering motor with the learned data stored in the storage.

12. The method of claim 10, further comprising, when a measured speed of the vehicle, a measured steering angle, and a measured steering speed do not satisfy the one or more set learning conditions, estimating, by the controller, the measured current value of the steering motor from the learned data, and comparing, by the controller, the measured current value of the steering motor with the estimated current value of the steering motor.

13. The method of claim 9, further comprising determining, by the controller, whether one or more learning execution conditions are satisfied before the learning of the measured current value of the steering motor under the one or more set learning conditions.

14. The method of claim 9, wherein the learning of the measured current value of the steering motor under the one or more set learning conditions includes:
  determining, by the controller, whether the one or more set learning conditions are satisfied upon steering; and
  learning, by the controller, the current value of the steering motor measured upon the steering when the one or more set learning conditions are satisfied.

15. One or more non-transitory machine-readable storage media storing instructions which are executable by one or more processors to perform operations comprising:
  learning, by a controller, a measured current value of a steering motor under one or more set learning conditions, the steering motor configured to generate a steering force based on steering-related information of a vehicle received from a processor of an autonomous driving module;
  storing, by a storage, the measured current value of the steering motor, learned by the controller under the one or more set learning conditions, as learned data;
  comparing, by the controller, the measured current value of the steering motor with the learned data stored in the storage; and
  generating, the controller, a warning signal when a change in the measured current value of the steering motor is out of a predetermined range set based on the learned data stored in the storage.

16. The non-transitory machine-readable storage media of claim 15, wherein the one or more set learning conditions include one or more preset speeds of the vehicle and one or more preset combinations of one or more preset steering angles and one or more preset steering speeds.

17. The non-transitory machine-readable storage media of claim 16, wherein the operations further comprise, when a measured speed of the vehicle, a measured steering angle, and a measured steering speed satisfy the one or more set learning conditions, comparing, by the controller, the measured current value of the steering motor with the learned data stored in the storage.

18. The non-transitory machine-readable storage media of claim 16, wherein the operations further comprise, when a measured speed of the vehicle, a measured steering angle, and a measured steering speed do not satisfy the one or more set learning conditions, estimating, by the controller, the measured current value of the steering motor from the learned data stored in the storage, and comparing, by the controller, the measured current value of the steering motor with the estimated current value of the steering motor.

19. The non-transitory machine-readable storage media of claim 15, wherein the operations further comprise determining, by the controller, whether one or more learning execution conditions are satisfied before the learning of the measured current value of the steering motor under the one or more set learning conditions.

20. The non-transitory machine-readable storage media of claim 15, wherein the learning of the measured current value of the steering motor under the one or more set learning conditions includes:
  determining, by the controller, whether the one or more learning conditions are satisfied upon steering; and
  learning, by the controller, the current value of the steering motor measured upon the steering when the one or more learning conditions are satisfied.

* * * * *